E. T. SILVIUS.
FILING APPLIANCE.
APPLICATION FILED AUG. 25, 1913.
1,231,798.
Patented July 3, 1917.
3 SHEETS—SHEET 1.
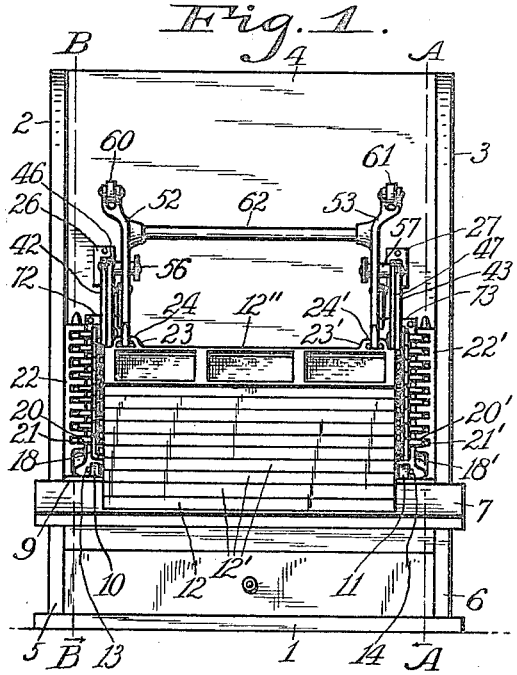
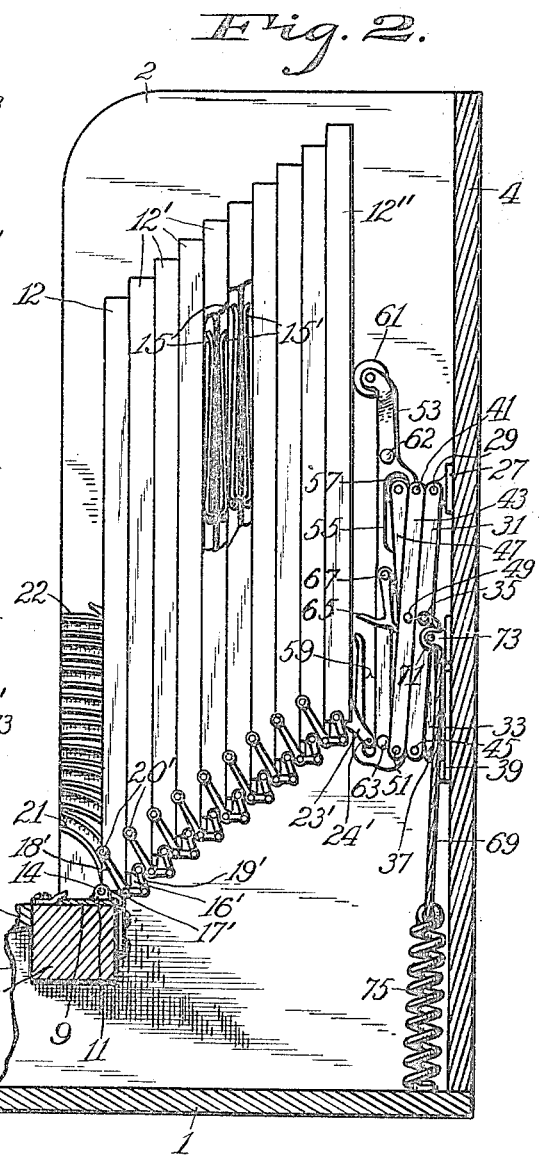
WITNESSES:
J. H. Gardner
M. E. Sparrow
INVENTOR:
Ellis T. Silvius

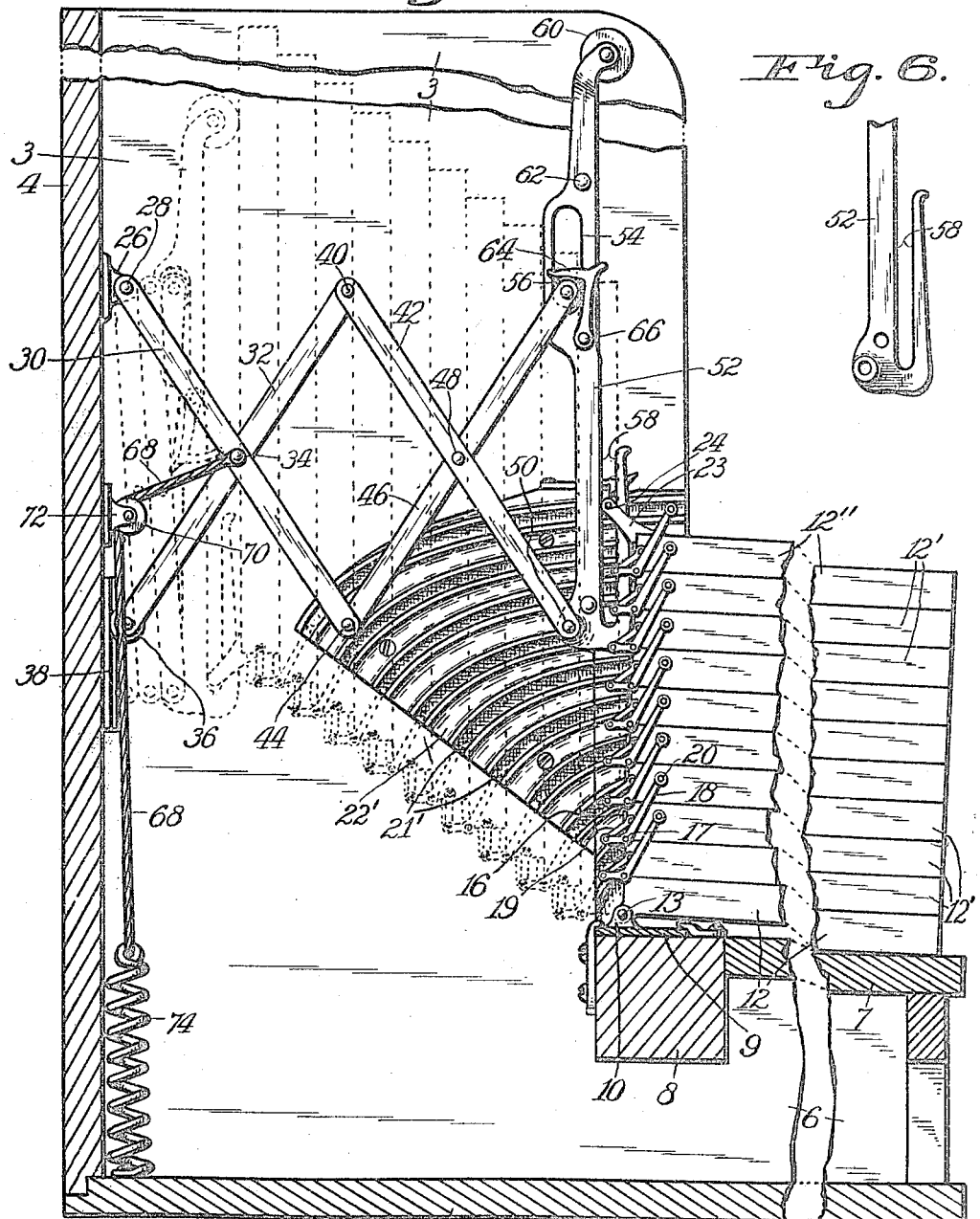

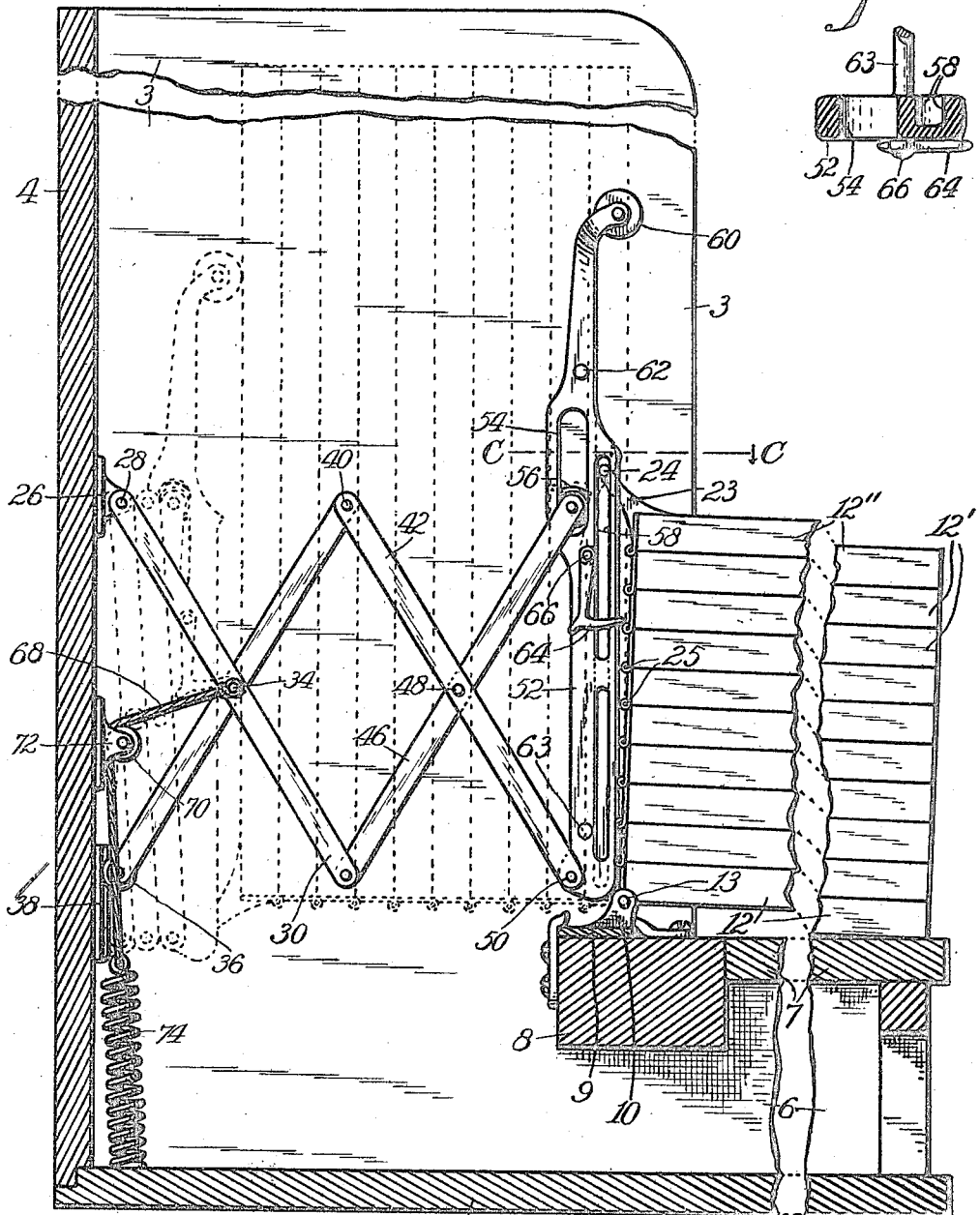

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,231,798. Specification of Letters Patent. Patented July 3, 1917.

Application filed August 25, 1913. Serial No. 786,427.

*To all whom it may concern:*

Be it known that I, ELLIS T. SILVIUS, a citizen of the United States, residing at Indianapolis, in the county of Marion and State of Indiana, have invented a new and useful Improvement in Filing Appliances, of which the following is a specification, reference being had to the accompanying drawings and to the letters and figures of reference marked thereon.

This invention relates to the type of filing appliance that is designed to be used for systematically preserving various kinds of papers, more especially duplicate bill slips commonly used in credit account systems, the invention having reference more particularly to filing cabinets comprising leaves or frames hingedly connected together and adapted to hold papers thereon for future reference.

An object of the invention is to provide improved equalizing or paralleling apparatus for filing cabinets of the above mentioned character that shall be so constructed as to be adapted for use in connection with either leaves having adjustably hinged connections, or with leaves directly hinged together so as to form a rectangular pack at all times, which apparatus shall be adapted for use in connection with a small number of filing leaves or with a relatively large number of leaves.

A further object is to provide improved equalizing apparatus that shall be so constructed as to permit of being supported behind the pack of filing leaves in case there are no casing sides available.

A still further object of the invention is to provide equalizing apparatus that shall be so constructed as to operate noiselessly, and whereby when one or a number of the leaves are moved to prone position the leaves remaining in upright position are maintained in substantially vertical position while they are moved forward by the operated leaves, which apparatus may be constructed at relatively small cost and be convenient and durable in use.

The invention consists in a filing cabinet or appliance comprising a supporting case or stand in which filing leaves or frames are pivotally mounted and hingedly connected together, and an improved movable abutment or follower mounted on the back of the case and adapted to be connected with one of the leaves or frames for preventing them from tilting or falling rearward from upright position. The invention also consists further in the parts and combination and arrangement of parts as hereinafter particularly described and claimed.

Referring to the drawings, Figure 1 is a front elevation of a filing cabinet or credit register constructed substantially in accordance with the invention, the filing leaves or frames being in prone position; Fig. 2, a fragmentary section approximately on the line A A in Fig. 1 but with the leaves in normal upright position; Fig. 3, a fragmentary top plan of the appliance with the leaves in prone position; Fig. 4, a fragmentary perspective view of one of the filing leaves or frames; Fig. 5, a fragmentary section approximately on the line B B in Fig. 1; Fig. 6, a fragmentary detail showing a portion of one of the parts of the abutment or equalizer; Fig. 7, a fragmentary section showing the leaves as directly hinged together and the equalizer slightly modified so as to coöperate with the modified arrangement of the leaves, and Fig. 8 a fragmentary section on the line C C in Fig. 7. Throughout the drawings similar reference characters in the different figures thereof indicate corresponding elements or features of construction herein referred to and described.

In practically carrying out the objects of the invention the case or stand for the filing leaves may be variously constructed and may suitably comprise a bottom 1 and two suitable upright side members 2 and 3, to the rear of which a back 4 is secured, the forward portions 5 and 6 of the side members being relatively low and provided with a suitable top 7 for supporting the leaves when in prone position. A rail or leaf support 8 is fixedly supported at a suitable distance forward of the back 4, preferably by means of the side members. A suitable base plate 9 is preferably provided and removably secured upon the rail 8 and is provided with pivot stands 10 and 11. A suitable number of filing leaves or frames are provided which may all be substantially alike, there being a front leaf 12, intermediate leaves 12′ and a rear leaf 12″, all arranged face to face and variously connected together so as to have relative pivotal movement, the front leaf being provided with pivots 13 and 14 that are mounted in the pivot stands so that the front leaf supports the remaining leaves. Each leaf or frame is provided with suitable means for securing papers thereon, spring clamps 15, 15' being suitable for the purpose.

The leaves may be connected together by means of movable or adjustable hinging connections provided with controlling means, such for instance as described in my pending application for Letters Patent filed April 26, 1911, Serial No. 623,424, which will be here only briefly described, each one of the leaves excepting the front one having two hinge bars 16 and 16' movably mounted in the normal lower portion thereof and connected to the next adjacent forward one of the leaves by means of pivots 17 and 17', so that the leaves may move vertically relatively to the several adjacent forward leaves. Controlling levers 18 and 18' are mounted between their ends on the pivots and have links 19 and 19' pivotally connected thereto, the links being pivotally connected also with the adjacent leaves. The levers are provided with guide pins 20 and 20', respectively, that operate in curved guideways 21 and 21' formed in plates 22 and 22' which are secured on the side members 2 and 3, respectively. The rear leaf of the frame is provided with arms 23 and 23' that extend downwardly and rearwardly and are provided with guide pins 24 and 24', respectively.

In some cases the leaves or frames are connected together by means of simple hinges 25 and 25' in a well known manner so that the leaves form a rectangular pack whether in normal upright position or in prone position, as illustrated in Fig. 7.

Whether the leaves or frames are directly hinged together, or connected by means of adjustable hinges so as to permit the leaves when in normal position to stand *in echelon* or stepped arrangement and permitting the leaves to be collocated so as to form a rectangular pack when in prone position, it is preferable that all the leaves when in upright position shall at all times be substantially vertical, and this is accomplished by means of the improved equalizer which preferably comprises two pivot blocks 26 and 27 fixedly secured to the back 4 and provided, respectively, with pivots 28 and 29 arranged on one and the same horizontal plane and to which two primary cross-bars, 30 and 31, are connected at one end, two similar cross-bars 32 and 33 being connected at their middle portions to the cross-bars 30 and 31 by means of pivots 34 and 35, respectively, so as to constitute lazy-tongs, the cross-bars 32 and 33 extending downward approximately to the back 4 for movable support thereon, being preferably provided with rollers 36 and 37, respectively, that run on vertically arranged guides 38 and 39, respectively, the guides being secured to the back 4 at a suitable distance below the pivot blocks. The upper portions of the cross-bars 32 and 33 are provided with pivots 40 and 41, respectively. The structure and range of operation of the equalizer may be extended to any desired or required extent, depending upon the number of filing leaves required. For the purpose of illustration two other cross-bars 42 and 43 are connected at one end with the pivots 40 and 41, respectively, and normally extend downward therefrom. The lower portions of the cross-bars 30 and 31 are provided with pivots 44 and 45, respectively, to which two supplemental cross-bars 46 and 47 are connected, respectively, at one end and extend upward and are connected at the middle portions to middle portions of cross-bars 42 and 43 by means of pivots 48 and 49, respectively. The lower portions of the cross-bars 42 and 43 are connected by means of pivots 50 and 51 to the rear portions of two improved abutment bars 52 and 53 that are normally arranged vertically and have longitudinally arranged guideways 54 and 55 therein, respectively, in the rear portions thereof above the pivots 50 and 51. The upper portions of the cross-bars 46 and 47 are provided with lateral guide pins or rollers 56 and 57, respectively, that have movable connections with the guideways 54 and 55, respectively, for maintaining the abutment bars in vertical position while permitting free movement of the lazy-tongs. The opposite or forward portion of the abutment bars 52 and 53 have longitudinally arranged guideways 58 and 59 therein that receive the guide pins 24 and 24', respectively, for connecting the equalizer or abutment with the filing leaves or frames, the upper portion of the abutment bars being preferably provided with rollers 60 and 61 against which the upper portion of the rear leaf is supported against tilting backward from upright position. The two abutment bars preferably are connected together by means of tie-rods 62 and 63. In order to retain the equalizer in extended position in which it may be left after removing the leaves or frames from the case, a suitable locking device is provided and preferably comprises two hooks 64 and 65 connected to the two abutment bars by means of pivots 66 and 67 below the guideways 54 and 55, respectively. The hooks when not in use hang downward and are adapted to be moved into engagement with the upper portions of the guide pins or rollers 56 and 57, respectively, for preventing movement of the latter in their guideways; thus preventing collapsing of the equalizer.

In order to assist the leaves to rise from prone to upright position the equalizer preferably is provided with means for retracting or collapsing it and may comprise two cords 68 and 69 suitably connected, as to the pivots 34 and 35, respectively, and extending over guide sheaves 70 and 71 supported by sheave blocks 72 and 73, respectively, that are secured to the back 4 of the case between the pivot blocks and the guides above described, the cords being connected to coil-springs 74 and 75 that are suitably connected to the case, preferably to the bottom 1 thereof adjacent to the back 4.

It should be understood that although the two abutment bars and supports therefor are preferable in most cases it may in some cases be desired to employ only one abutment bar, and if desired the retracting springs may be dispensed with.

In practical use, the leaves being normally in upright position, are moved forward to prone position, one or more at a time for the purpose of placing papers thereon or removing or inspecting the papers, the remaining leaves consequently being moved forward and are maintained during movement in normal upright position by means of the equalizer which freely moves forward with the leaves. When the leaves are in normal position they are inclined by the force of gravity to lean against the abutment and therefore will not fall forwardly. While the abutment bars are moved forwardly or backwardly relatively to the back 4 they are kept in parallel arrangement with the back by means of the lazy-tongs support thereof. When one or more of the leaves are in prone position the retracting springs act and the abutment tends to draw the guide pins 24 and 24' rearward and therefore tend to cause the leaves to rise from prone position, the force exerted being dependent upon the relative strength of the springs.

Having thus described the invention, what is claimed as new is—

1. A filing appliance including a plurality of pivotally supported leaves, an equalizer including a plurality of cross-bars pivotally connected together for relative parallel movement, one of the cross-bars being pivoted to a supporting pivotal block, and an abutment bar for the leaves having pivotal connection with one and sliding pivotal connection with another one of the cross-bars, said abutment bar having movable connection with one of the leaves.

2. In a filing appliance, a plurality of leaves, an equalizer including an abutment bar for the leaves having two guideways longitudinally arranged in opposite portions thereof, and two cross-bars pivotally connected together between their ends, one of the cross-bars being pivotally connected to one end of the abutment bar, the remaining cross-bar having movable connection with one of the guideways in the other end of the abutment bar, and the remaining guideway having sliding engagement with one of the leaves.

3. A filing appliance including a plurality of leaves and an equalizer including a plurality of cross-bars pivotally connected together for relative parallel movement, one of the cross-bars being provided with a supporting pivot block, an adjacent one being provided with a guide roller, and an abutment bar having pivotal connection with one and sliding connection with another one of the cross-bars, the abutment bar projecting beyond the cross-bars with which it is connected and provided on its extremity with a roller for engaging one of the leaves.

4. A filing appliance including a casing back, two primary cross-bars pivotally connected together between their ends, one of the cross-bars being pivotally conected to and supported by the back, the remaining one having movable contact with the back, two supplemental cross-bars pivotally connected together between their ends and pivotally connected to the primary cross-bars respectively, an abutment bar having two portions connected with the two supplemental cross-bars respectively and thereby maintained parallel to the back, said bar having movable connection at one end and slidable engagement at its other end with one of a plurality of connected filing leaves pivotally supported opposite to the back.

5. A filing appliance including a plurality of pivotally supported leaves, an equalizer including a main support, a guide sheave mounted on the support, a plurality of cross-bars pivotally connected together for relative parallel movement, one of the cross-bars being pivotally connected with and supported by the main support, the cross-bars being movable pivotally from or toward the support, an abutment bar for the leaves pivotally connected with one and slidingly connected with a companion one of the cross-bars, said abutment bar having movable connection with one of the leaves, means for horizontally guiding the plurality of cross-bars in their movement from or toward the main support, a cord connected with one of the cross-bars and extending about the sheave, and a supported spring connected to the cord.

6. In a filing appliance, the combination of a case, a plurality of filing leaves normally arranged uprightly *in echelon* in the case, means for pivotally supporting and connecting the leaves one to another for relative longitudinal movement, extensible or contractible equalizing means pivotally connected and also slidingly contacting with the case, an upright abutment bar having the lower portion thereof pivotally connected with and supported by the equalizing means, the upper portion of said bar having sliding pivotal connection with said equalizing means, and means for connecting the rear one of the leaves with the abutment bar.

7. In a filing appliance, the combination with an upright support, a plurality of filing leaves uprightly arranged forward of the support, and means for pivotally supporting the leaves to enable them to stand *in echelon* or to move pivotally to prone superimposed position, of an uprightly arranged abutment connected with the normal lower portion of the rear one of the leaves to permit relative upward or downward movement, and a plurality of cross-bars pivotally connected together and to the upright support and the abutment for supporting and guiding the abutment parallel to the support and in contact with the rear one of the leaves.

8. In a filing appliance, the combination with a case having an upright back, a plurality of filing leaves uprightly arranged in the case and connected together for relative pivotal movement, the foremost one of the leaves being pivotally supported forward of the back, of an equalizing appliance mounted on the back and adapted to have extensible movement from the back, the top of the main or supporting portion of the appliance when moving being guided constantly on one horizontal plane, the forward portion of the appliance being carried upward during the extending movement of the appliance, said forward portion being connected with one of the plurality of filing leaves.

9. In a filing appliance, the combination with an upright supporting back, a plurality of filing leaves uprightly supported to move pivotally away from the back, an abutment uprightly arranged behind the rear one of the leaves in movable contact therewith and provided with a vertical guideway, and means for connecting one of the rearward leaves with the abutment, of a plurality of cross-bars pivotally connected together and constituting a horizontally contractible or extensible lazy-tongs structure, the upper end of one of the cross-bars being pivotally supported by the supporting back, the lower end of the companion one of the cross-bars being provided with a roller, the lower end of another one of the cross-bars being pivotally connected to the abutment bar, the upper end of the companion one of the last-described cross-bars being provided with a guide pin having movable connection with the guideway of the abutment, and a guide mounted on the supporting back and guiding said roller.

In testimony whereof, I affix my signature in presence of two witnesses.

ELLIS T. SILVIUS.

Witnesses:
J. H. GARDNER,
M. E. SPARROW.

Copies of this patent may be obtained for five cents each, by addressing the "Commissioner of Patents. Washington, D. C."